(12) United States Patent
Heutger et al.

(10) Patent No.: US 10,372,095 B2
(45) Date of Patent: Aug. 6, 2019

(54) METHOD FOR THE FAIL-SAFE OPERATION OF A PROCESS CONTROL SYSTEM WITH REDUNDANT CONTROL DEVICES

(71) Applicant: Phoenix Contact GmbH & Co. KG, Blomberg (DE)

(72) Inventors: Henning Heutger, Bad Pyrmont (DE); Thorsten Uhde, Hameln (DE); Dimitri Oks, Oerlinghausen (DE); Sascha Hollmann, Lemgo (DE); Jens Baeunker, Herford (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 859 days.

(21) Appl. No.: 14/379,414

(22) PCT Filed: Feb. 19, 2013

(86) PCT No.: PCT/EP2013/053269
§ 371 (c)(1),
(2) Date: Aug. 18, 2014

(87) PCT Pub. No.: WO2013/124268
PCT Pub. Date: Aug. 29, 2013

(65) Prior Publication Data
US 2015/0018980 A1      Jan. 15, 2015

(30) Foreign Application Priority Data
Feb. 20, 2012   (DE) .................. 10 2012 003 242

(51) Int. Cl.
*G05B 19/042*   (2006.01)
*G05B 15/02*    (2006.01)
(Continued)

(52) U.S. Cl.
CPC .......... *G05B 19/042* (2013.01); *G05B 15/02* (2013.01); *G05B 19/0428* (2013.01);
(Continued)

(58) Field of Classification Search
None
See application file for complete search history.

(56) References Cited

U.S. PATENT DOCUMENTS 7,451,215 B2    11/2008  Hawkinson et al.
8,132,042 B2 *   3/2012  Jordan .................... H04L 69/40
                                                                 714/4.1
(Continued)

FOREIGN PATENT DOCUMENTS

DE   102008020507 A1   10/2009
EP       1860564 A1   11/2007
WO      01016749 A2    3/2001

OTHER PUBLICATIONS

"Related International Patent Application No. PCT/EP2013/053269", "International Search Report and Written Opinion", dated Jun. 18, 2013, Publisher: PCT/ISA, Published in: EP.
(Continued)

*Primary Examiner* — Eric C Wai
(74) *Attorney, Agent, or Firm* — Kaplan Breyer Schwarz, LLP

(57) ABSTRACT

A process control system is provided which has at least one OPC client and one OPC server which communicate via a standardized OPC interface. Furthermore the process control system has at least two redundantly operated control devices which each communicate with the OPC server by means of a coupling device. Each control device is designed to provide process variables and status information. The status information contains the current role of the respective control device, wherein the current role is either that of a main control device or an auxiliary control device. The OPC
(Continued)

server is designed to detect the main control device in response to the status information of at least one control device, to register a list of variables generated by the OPC client at the main control device and/or to transmit to the OPC client only the process variables which have been provided by the main control device.

11 Claims, 1 Drawing Sheet

(51) Int. Cl.
    *G06F 11/16*     (2006.01)
    *G05B 11/01*     (2006.01)

(52) U.S. Cl.
    CPC ........ *G06F 11/165* (2013.01); *G06F 11/1633* (2013.01); *G06F 11/1654* (2013.01); *G05B 2219/24175* (2013.01); *G05B 2219/24182* (2013.01); *G05B 2219/24184* (2013.01); *G05B 2219/24215* (2013.01); *G05B 2219/25032* (2013.01); *G05B 2219/25369* (2013.01); *G05B 2219/34263* (2013.01); *G06F 11/1695* (2013.01)

(56) References Cited

U.S. PATENT DOCUMENTS

| | | |
|---|---|---|
| 2003/0012693 A1 | 1/2003 | Otillar et al. |
| 2005/0097165 A1* | 5/2005 | Lahtinen ................ G05B 9/03 709/203 |
| 2008/0114872 A1 | 5/2008 | Fisher et al. |

OTHER PUBLICATIONS

"International Report on Patentability", dated Sep. 4, 2014, issued in counterpart International Patent Application No. PCT/EP2013/053269.

"German Office Action", issued in related patent application No. 10 2012 003 242.0, dated Feb. 22, 2013.

"European Office Action", European Patent Application 13 707 134.6, Nov. 9, 2017, 13 pp.

\* cited by examiner

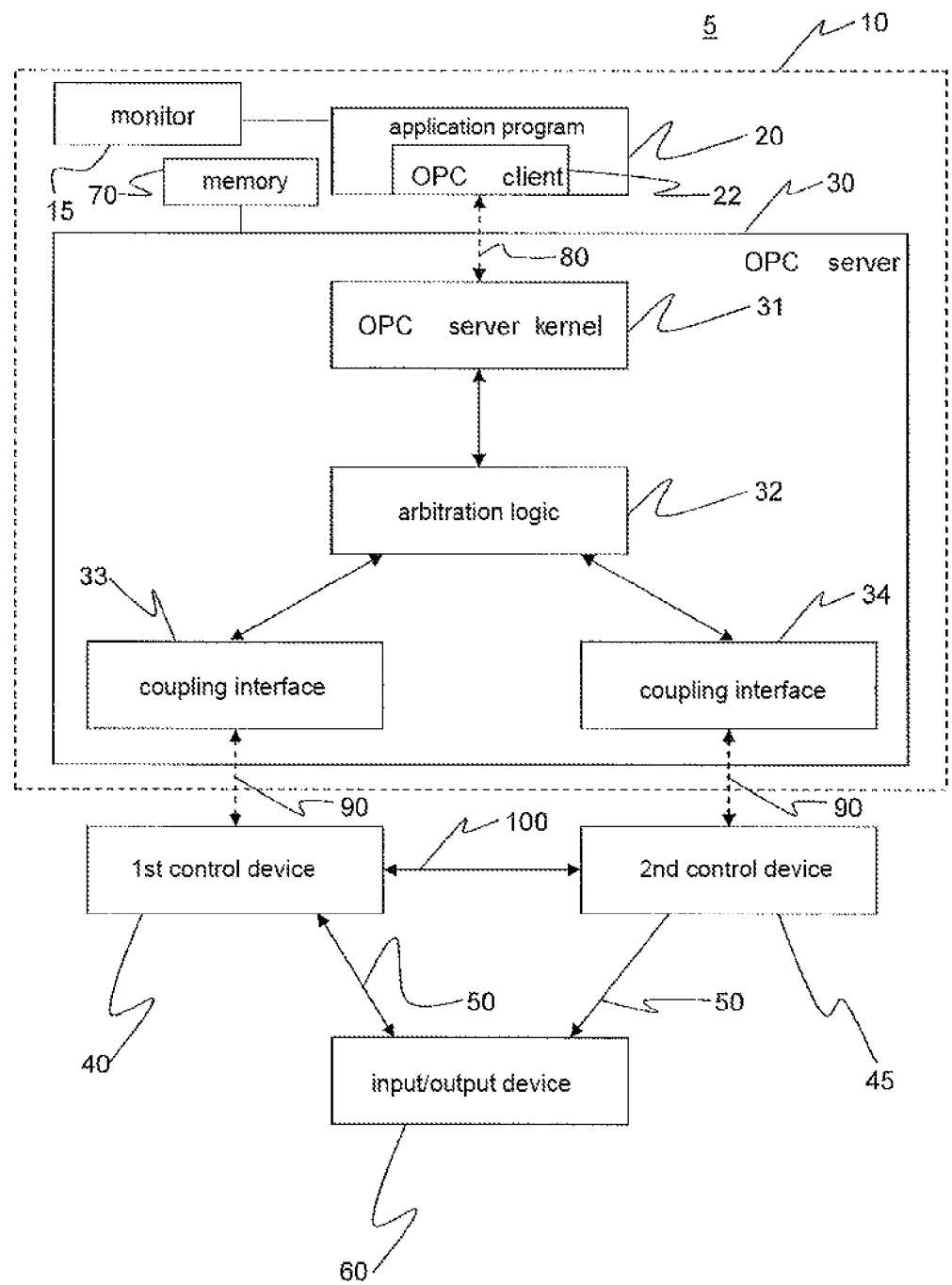

METHOD FOR THE FAIL-SAFE OPERATION OF A PROCESS CONTROL SYSTEM WITH REDUNDANT CONTROL DEVICES

FIELD OF THE INVENTION

The invention relates to a method for fail-safe operation of a process control system, in particular a SCADA system, a corresponding process control system as well as a computer program for installation on a computer of such a process control system.

BACKGROUND OF THE INVENTION

SCADA systems (SCADA: supervision, control and data acquisition) are generally known. They are based on a conventional client-server application and for this purpose have so-called OPC clients and OPC servers. The OPC clients and OPC servers facilitate a standardized and open data communication, in order for example to obtain access to closed process data, also referred to as process variables, of subordinate data sources. OPC is an acronym for "OLE for process control". The objective of an OPC server is amongst other things to assist an OPC client in the reading of process variables, changing of process variables and monitoring of process variables. As a rule the OPC server carries out these objectives following a request by the OPC client. One such SCADA system is described for example in the textbook "Automatisieren mit SPS-Theorie and Praxis, O. Wellenreuther et al., Vieweg+Teubner, 4th edition, 2009".

In order to be able to ensure that process control systems operate reliably and in a fail-safe manner in particular in the monitoring of critical states, for example in the monitoring of road tunnels, specific system components are designed to be redundant.

US 20030012693 A1 discloses a redundant process control system which has an OPC client, a plurality of OPC servers and a plurality of data sources connected to the OPC servers. In order to facilitate a redundant operation, the OPC client has a redundancy manager which receives and evaluates process data from a plurality of different data sources. The data sources which transfer data to the OPC client are connected by means of one or more OPC servers to the OPC client. In a further known redundant process control system at least one data source is connected by means of two redundantly operated OPC servers to the OPC client. The selection of a suitable OPC server is made by the redundancy manager of an OPC client.

A similar system is known from U.S. Pat. No. 7,451,215 B2. The known process control system has two redundantly operated OPC servers which function as the main or auxiliary OPC server. Both OPC servers are connected to a data source which makes process variables available for an OPC client. The decision as to which OPC server functions as the main OPC server is made by the OPC client.

SUMMARY OF THE INVENTION

The known process control systems have the disadvantage that the detection of a switchover between the redundant components which takes place in the OPC client and the provision of new process variables can last for several seconds. During this time the process control system cannot handle the process to be executed.

Therefore the object of the invention is to provide a computer program, a process control system and also a method for fail-safe operation of a process control system by which the time for switching over between redundant system components and for the resumption of the process control after switching over can be shortened by comparison with the known process control devices. A further objective is to be seen in the provision of a redundant process control system which can be implemented and maintained more simply and more quickly.

A core idea of the invention is that the redundancy management of control devices is not performed by an OPC client but by an OPC server. As a result only one single OPC server can be used in a process control system in order to be able to provide process variables in redundant form.

Accordingly a method for the fail-safe operation of a process control system is provided. The process control system has at least one OPC client and one OPC server which communicate via a standardized OPC interface, as well as at least two redundantly operated control devices. The control devices each communicate with the OPC server by means of a coupling device. The coupling devices are generally producer-specific interfaces.

First of all the roles of the control devices are ascertained, one control device being operated as the main control device and the other control device being operated as the auxiliary control device. The main control device is the processing control device, whereas the auxiliary control device also runs for example in the "hot standby" mode.

The roles may for example be fixed by the user at the start of process control or may be automatically negotiated directly between the control devices using a predetermined algorithm.

Status information which contains the current role of the respective control devices is provided for the OPC server by each control device. In response to the status information of at least one of the control devices the main control device is detected by the OPC server. A list of variables generated by the OPC client is registered at the main control device under the control or arbitration of the OPC server.

The feature "registering a list of variables" is understood for example to mean:
  the OPC client requests the OPC server to read and transmit to it the process variables or data in the list of variables from the main control device. or
  the OPC client requests the OPC server to cause the process variables or data in the registered list of variables to be amended in a subordinate input/output device or to be written to an input/output device.

Only the process variables which have been provided by the main control device are transmitted to the OPC client under the control or arbitration of the OPC server.

In order not to have to increase the computing power of a computer on which the OPC server is installed, the OPC server advantageously only requests status information of the auxiliary control device, preferably at adjustable times. In this case the main control device is detected by the OPC server in response to the status information of the auxiliary control device. Moreover, in this way it is ensured that even in the event of failure of the main control device the OPC server can detect a switchover from the previous main control device to the new main control device.

The roles of the control devices are advantageously interchanged as a function of a predeterminable event. One such event may be the detection of the failure of the current main control device. Furthermore, events which give rise to an interchange of roles may be defined for example by the user itself. Such events may for example be time stamps.

In order to facilitate a quick switchover between the control devices, the OPC server advantageously ensures that the list of variables generated by the OPC client is present in identical form on both control devices. Accordingly under the control of the OPC server the list of variables generated by the OPC client is duplicated and then also registered at the auxiliary control device.

Depending upon the embodiment of the process control system, the list of variables generated by the OPC client can be registered in a chronological sequence advantageously first of all at the main control device and then at the auxiliary control device. It is also conceivable for the list of variables to be registered only at the auxiliary control device when sufficient computing power is available.

In order to facilitate a quick and secure switchover between the control devices, it is also useful for the control devices to be synchronized with regard to the process variables and/or status information via a synchronization link. Therefore the status information can also contain details of the presence or absence of a synchronization link between the control devices.

After a switchover between the control devices, i.e. an interchange of roles of the control devices, in order that the current process variables can be provided quickly, in operation the process variables requested by the OPC client device are read and buffered by both the main and also the auxiliary control device under the control of the OPC server. Thus after a switchover process the OPC server can quickly provide the process variables of the new main control device to the OPC client.

In order to ensure that a main control device is available for process management, even in the event of failure of a synchronization link between the control devices, the OPC server can select one of the control devices as the main control device if it has detected an interchange of roles n times within an adjustable time period. This strategy makes provision for a system failure resulting from an interruption of the synchronization link between the control devices, namely when both control devices act as the main control device in relation to the OPC server.

Accordingly a process control system with at least one OPC client and one OPC server is provided, in which the OPC client and the OPC server communicate via a standardized OPC interface.

Furthermore the process control system has at least two redundantly operated control devices which each communicate with the OPC server via a coupling device. Each control device is designed to provide process variables and status information. The status information contains the current role of the respective control device, wherein the current role is either that of the main control device or the auxiliary control device. The OPC server is designed to detect the main control device in response to the status information of at least one of the control devices, to register a list of variables generated by the OPC client at the main control device and/or to transmit to the OPC client only the process variables which have been provided by the main control device.

The OPC client and the OPC server can be installed on a common computer or on separate computers.

Accordingly a computer program is provided for installation on a computer of a process control system with the redundant control devices. The computer program contains instructions for controlling the computer in order to detect the main control device in response to the status information of at least one of the control devices, to register a list of variables generated by the OPC client at the main control device and/or to transmit to the OPC client only the process variables which have been provided by the main control device.

BRIEF DESCRIPTION OF THE DRAWINGS

The invention is explained in greater detail below with reference to an embodiment in connection with a drawing.

The drawing shows by way of example a process control system 5 which may be designed as a SCADA system. The process control system 5 preferably serves for monitoring, controlling and/or regulating a technical process as well as exchanging process variables.

DETAILED DESCRIPTION

The process control system 5 shown by way of example has a PC 10 which may include a monitor 15 and at least one memory 70. An OPC-capable user program 20 which includes a conventional OPC client 22 is installed on the PC 10. The user program 20 may for example be visualization software. Furthermore an OPC software component 30 which supports the OPC client 22 according to a client-server application is installed on the PC 10. This software component is called the OPC server. The OPC server 30 has a standardized OPC interface 31, also referred to as an OPC server kernel, by means of which the OPC client 22 and the OPC server 30 can exchange data in standardized form. At this point it may be noted that OPC communication is known to the person skilled in the art, so that it is only explained here in so far as it is significant for the invention. The communication connection between the OPC client 22 and the OPC interface 31 is provided with the reference sign 80 in the drawing. It may be noted at this point that the user program 20 with the OPC client 22 and the OPC server 30 can be installed on separate computers. In this case the OPC communication takes place between the OPC client 22 and the OPC server 30, for example via a TCP/IP-based Intranet of the customer.

We now refer to the drawing again. The OPC server 30 also contains a software module designated as arbitration logic 32, which, as is explained in greater detail below, performs the redundancy management and control of the process control system 5. The arbitration logic 32 can communicate via the OPC interface 31 of the OPC server 30 with the OPC client 22 of the user program 20. As shown in the drawing, the user program 20 can transmit the data to be displayed to the monitor 15.

The OPC server 30 can have two coupling modules 33 and 34, by means of which the OPC server 30 can communicate with a first control device 40 and a second control device 45. The coupling interface 33 is assigned to the first control device 40, and the coupling interface 34 is assigned to the second control device 45. The coupling modules or coupling interfaces are preferably producer-specific communications interfaces which convert data coming from the control device 40 or 45 into an OPC format.

The definition of the control devices as first control device and second control device can be undertaken by the user and can be retained during the entire process control. The physical coupling of the control devices 40 and 45 to the PC 10 can take place by means of an industrial TCP/IP-based communications network 90.

It may be noted that the OPC server 30 can also communicate with more than the two illustrated redundant control devices 40 and 45. The two control devices 40 and 45, which are operated redundantly within the process control system 5, are only connected to an input/output device 60 in the present example to simplify discussion. The input/output device 60 may be a sensor or an actuator. The input/output device 60 can communicate via a TCP/IP-based network 50, for example the Profinet 50, with the control devices 40 and 45. Between the two control devices 40 and 45 a synchronization link 100 can be set up, via which the two control devices exchange and synchronize data, for example process variables and status information, with one another. The memory 70, in which for example the process variables and status information requested by the control devices 40 and 45 can be stored, is assigned to the OPC server 30.

The mode of functioning of the process control system 5, in particular the mode of functioning of the OPC server 30 expanded by a redundancy management, is explained in greater detail below.

As already mentioned, the two control devices 40 and 45 are configured so that in the process control system 5 the control device 40 can be defined as the first control device and the control device 45 as the second control device. This setting is generally maintained during the entire process running time.

Furthermore it may be assumed that the two control devices 40 and 45 have negotiated their roles via the synchronization link 100 before the commissioning of the process control system 5. For example it has been negotiated that the control device 40 is to function as the main control device and the control device 45 is to function as the auxiliary control device. The main control device is designated as the processing control device which, as is stated in greater detail below, controls the input/output device 60 and communicates via the OPC server with the OPC client 22. The auxiliary control device is the redundant control device running synchronously, which can also be designated as a substitute control device or backup control device.

Furthermore, it may be assumed that the input/output device 60 is a temperature sensor which at adjustable times communicates its process data, that is to say temperature values, to the two control device 40 and 45.

The two control devices 40 and 45 are designed to generate status information. The status information includes inter alia the current role of the respective control device as well as information as to whether or not a synchronization link 100 exists between the control devices 40 and 45. In the present example the status information of the control device 40 includes the following details: "main control device" and "synchronization link exists".

The control device 45 has generated the following status information: "auxiliary control device" and "synchronization link exists".

Alternatively it is conceivable that the roles are assigned to the control devices manually by the user before commissioning of the process control system 5.

It is important to point out that in the process control system 5 illustrated in the drawing the OPC client 22 assumes that only one single control device is present. This means that the OPC client 22 does not know that it is part of a redundant process control system with redundantly operated control devices.

According to a preferred embodiment of the process control system 5, first of all the status information of the control devices 40 and 45 is read by the OPC server 30. In response to at least one of the read items of status information the arbitration logic 32 detects that the control device 40 is currently the main control device, whereas the control device 45 is currently the auxiliary control device is. On the basis of this knowledge the arbitration logic 32 of the OPC server 30 now only reads the status information of the auxiliary control device 45 cyclically and stores the status information for example in the memory 70.

It may now be assumed that the application program 20 may request current process data of the input/output device 60 via the OPC server 30. For this purpose the application program generates a corresponding list of variables which is transmitted via the OPC client 22 to the OPC server 30. By the reception of one list of variables the OPC server 30 is requested to read the corresponding process data from the input/output device 60. For this purpose it registers the list of variables at the two control devices 40 and 45.

The registration of the list of variables at the control device begins so that the list of variables received by the OPC client 22 is transmitted via the OPC server kernel 31 to the arbitration logic 32 which duplicates the list of variables of the OPC client 22. The duplicated lists of variables are then transmitted under the control or arbitration of the arbitration logic 32 via the coupling interfaces 33 and 34 and the communications network 90 both to the main control device 40 and also to the auxiliary control device 45 and thus are registered there.

In order to facilitate a quick data exchange between the main control device 40 and the OPC client 22, depending upon the embodiment the list of variables can first be transmitted to the main control device 40, and then, controlled by a so-called background task, can be transmitted with a time delay to the auxiliary control device 45. Both the main control device 40 and also the auxiliary control device 45 then read the required process data from the input/output device 60.

According to an embodiment, at the same time or at different times the main control device 40 and the auxiliary control device 45 transmit the read process data of the input/output device 60 to the arbitration logic 32 of the OPC server 30. The process data, i.e. the temperature values of the input/output device 60, are preferably transmitted in a TCP/IP packet from the main control device 40 and the auxiliary control device 45 to the arbitration logic 32. Each packet contains the address or some other identification of the main control device 40 or the auxiliary control device 45. In this way the arbitration logic 32 of the OPC server 30 detects which process data have been transmitted by the main control device 40.

The arbitration logic 32 is programmed in such a way that it only transmits the process data received from the main control device 40 via the OPC server kernel 31 to the OPC client 22. The OPC client 22 transmits the received process data to the application program 20, which can ensure that the requested process data are correspondingly displayed on the monitor 15. The process data transmitted by the control devices 40 and 45 can be buffered in a lookup table in the memory 70. In this way it is ensured that, even after an interchange of roles the control devices, process data of the new main control device can be quickly made available to the application program.

According to a further embodiment it is also conceivable that the arbitration logic 32 of the OPC server 30 requests the process data of the input/output device 60 only from the main control device 40.

It may also be noted that at adjustable times the OPC client 22 can request process data in the previously described manner from the OPC server 30.

It may now be assumed that the OPC client 22 requests the OPC server 30 to cause process variables to be modified in the input/output device. Consequently a corresponding list of variables is generated by the application program 20 and is transmitted via the OPC server kernel 31 of the OPC server 30 to the arbitration logic 32. Again the list of variables is duplicated in the arbitration logic 32 and is then transmitted via the two coupling interfaces 33 and 34 to the main control device 40 or to the auxiliary control device 45. Only the main control device 40 then writes the new process variables into the input/output device 60.

During the process control, the two control devices 40 and 45 are synchronized at predetermined times, so that not only the status information, but also the process data received by the input/output device 60 as well as the lists of variables coming from the OPC client 22 are synchronized. In this way it is ensured that there is always an unambiguous assignment of roles and in the event of an interchange of roles the new main control device can take over the process management almost immediately.

It may now be assumed that in the main control device 40 an error has occurred which is communicated via the synchronization link 100 to the auxiliary control device 45. In response to the error information the control device 45 generates an item of status information which now shows the control device 45 as main control device instead. Since the OPC server 30 reads the status information of the current auxiliary control device 45 cyclically, for example every 100 milliseconds, it is therefore informed at the latest after 100 milliseconds by the status information of the former auxiliary control device 45 that the previous auxiliary control device 45 is now the main control device. The process management of the process control system 5 can thus be continued after a short switchover time. A data exchange now takes place under the control of the arbitration logic 32 between the OPC client 22 and the new main control device 45. This means that a list of variables coming from the OPC client 22 is duplicated in the arbitration logic 32 of the OPC server 30 and is transmitted to the new main control device 45, regardless of whether the previous main control device 40 is operational or not. If the control device 40 is no longer operational, the arbitration logic 32 will also no longer be able to request the status information of the control device 40. Moreover the arbitration logic 32 ensures that only the process data of the new main control device 45 which are read from the input/output device 60 are passed on to the OPC client 22.

Thus the process management can be continued quickly even if the defective control device 40 has failed completely.

As soon as the defective control device 40 has been replaced or repaired, depending upon the embodiment the user or the process control system 5 can cause the control device 40 to generate status information which identifies it as the auxiliary control device. This status information can then be transmitted during an interrogation cycle from the control device 40 to the arbitration logic 32 which in response to the received status information detects that the control device 40 is again operational as the auxiliary control device. From this time the arbitration logic 32 reads the status information again cyclically only from the new or repaired auxiliary control device 40. The OPC server 30 and in particular the arbitration logic 32 of the OPC server 30 then again ensure that lists of variables supplied from the OPC client 22 are transmitted to both control devices 40 and 45, regardless of which control device functions as the main control device.

Now a particular fault may be considered, in which the synchronization link 100 between the control devices 40 and 45 has failed or is interrupted. Since the two control devices 40 and 45 can now no longer synchronize their status information and process variables, a situation can occur in which both control devices are defined as the main control device.

Since as already mentioned above, according to an advantageous embodiment the OPC server 30 cyclically reads only the status information of the auxiliary control device, the arbitration logic 32 detects in the first cycle that the auxiliary control device 40 has transmitted status information which now shows it as the main control device. Consequently in the next cycle the arbitration logic 32 will ask the control device apparently functioning as the auxiliary control device 45 for status information. However, since this auxiliary control device also wishes to function as the main control device because of the failure of the synchronization link, the arbitration logic 32 receives status information from the control device 45, which indicates that this is now a main control device. Then in the next interrogation cycle the arbitration logic 32 would ask the control device 40 for the status information, since it also concludes from the status information received from the control device 45 that the control device 40 is now the auxiliary control device. In order to prevent continuous switchovers and thus a system failure, the arbitration logic 32 only switches over n times, for example twice, within a set time window and then selects, depending upon the embodiment, one of the two control devices as the main control device. Then the process control system 5 is operated as explained above.

The application program 20, the OPC client 22 and also the OPC server 30 are installed in the computer 10 in the explained example. It would also be conceivable to install the application program 20 with the OPC client 22 on the computer 10 and with the OPC server 30 on a separate computer. In this case the two separate computers would for example be connected to one another via the user's Intranet, by means of which the OPC communication between the OPC client 22 and the OPC server 30 would then also take place.

The OPC server 30 is a software component which contains conventional standardized OPC modules, such as the OPC server kernel 31. The OPC server has been expanded by an arbitration logic 32 which controls the computer 10 in such a way that the OPC server 30 can detect the main control device in response to the status information of at least one of the control devices 40 and 45, to register a list of variables generated by the OPC client 22 can be registered at the main control device, and/or only the process variables which have been provided by the main control device can be transmitted to the OPC client 22. In this way a quick switchover from one control device to the other control device is made possible.

What is claimed is:

1. A method for fail-safe operation of a process control system having only one OPC server and at least one OPC client which communicate via a standardized OPC interface, the process control system further including a first control device and a second control device, which are redundantly operated and configured to communicate with the only one OPC server via a corresponding coupling device, the method comprising:

a) ascertaining, with the only one OPC server, the roles of the first and second control devices, one of the first and second control devices operating as a main control device and the other one of the first and second control devices operating as an auxiliary control device;

b) receiving, with the only one OPC server, status information from each of the first and second control devices, wherein the status information identifies a current role of its respective control device;

c) detecting, with the only one OPC server, which of the first and second control devices is the main control device, wherein the detection is based on the status information received from each of the first and second control devices;

d) registering, at the main control device under the control of the only one OPC server, a list of variables generated by the OPC client, wherein the list of variables includes process variables;

e) reading and buffering the process variables requested by the OPC client by both the first and second control devices under the control of the only one OPC server; and f) transmitting, to the OPC client under the control of the only one OPC server, only the process variables that have been provided by the main control device.

2. The method of claim 1, wherein according to step b), the only one OPC server only requests status information of the auxiliary control device at adjustable times, and
 wherein according to step c), the main control device is detected by the only one OPC server in response to the status information of the auxiliary control device.

3. The method of claim 1, wherein according to step a), the roles of the first and second control devices are interchanged as a function of an event that has occurred.

4. The method of claim 1, wherein according to step d), the list of variables generated by the OPC client is also registered at the auxiliary control device under the control of the only one OPC server.

5. The method of claim 4, wherein the list of variables is first registered at the main control device.

6. The method of claim 1, wherein the first and second control devices are synchronized with regard to the process variables and status information by means of a synchronization link, and
 wherein the status information contains details about the presence or absence of the synchronization link.

7. The method of claim 1, wherein in step a), the roles of the first and second control devices are negotiated between the first and second control devices using a predetermined algorithm.

8. The method of claim 1, wherein the only one OPC server selects one of the first and second control devices as the main control device when the only one OPC server detects that the roles have changed n times within an adjustable time period.

9. A process control system comprising:
at least one OPC client;
only one OPC server which communicates with the OPC client via a standardized OPC interface; and
a first control device and a second control device, which are redundantly operated and configured to communicate with the only one OPC server via a corresponding coupling device;

wherein each of the first and second control devices provides process variables and status information to the only one OPC server, which status information identifies to the only one OPC server a current role of its respective control device;
wherein the current role of the first and second control device is either that of a main control device or an auxiliary control device; and
wherein the only one OPC server is configured to:
 (i) detect which of the first and second control devices is the main control device based on the status information received from the first and second control devices;
 (ii) register a list of variables generated by the OPC client at the main control device;
 (iii) read and buffer the process variables requested by the OPC client by both the first and second control devices; and
 (iv) transmit to the OPC client only the process variables which have been provided by the main control device.

10. The process control device of claim 9, wherein the OPC client and the only one OPC server are installed on a common computer or separate computers.

11. A non-transitory computer-readable medium having a computer program stored thereon, the non-transitory computer-readable medium for execution by a computer of a process control system comprising at least one OPC client, wherein the computer comprises only one OPC server which communicates with the OPC client via a standardized OPC interface, the process control system further comprising a first control device and a second control device that are redundantly operated and configured to communicate with the only one OPC server via a corresponding coupling device, wherein each of the first and second control devices provides process variables and status information to the only one OPC server, which status information identifies to the only one OPC server a current role of its respective control device, wherein the current role of the first and second control device is either that of a main control device or an auxiliary control device, and wherein the execution of the non-transitory computer-readable medium by the computer causes the computer to:
 detect which of the first and second control devices is the main control device in response to receiving the status information of the first and second control devices;
 register the list of variables generated by the OPC client at the main control device;
 read and buffer the process variables requested by the OPC client by both the first and second control devices; and
 transmit to the OPC client only the process variables which have been provided by the main control device.

* * * * *